United States Patent [19]

Naab

[11] Patent Number: 5,002,450

[45] Date of Patent: Mar. 26, 1991

[54] LIFTING AND TILTING DEVICE FOR EMPTYING CONTAINERS INTO A GARBAGE COLLECTOR

[75] Inventor: Jakob Naab, Mainz, Fed. Rep. of Germany

[73] Assignee: Zöller-Kipper Gmbh, Mainz-Laubenheim, Fed. Rep. of Germany

[21] Appl. No.: 401,074

[22] Filed: Aug. 31, 1989

[30] Foreign Application Priority Data

Sep. 6, 1988 [DE] Fed. Rep. of Germany ....... 3830227

[51] Int. Cl.⁵ ................................................ B65G 1/00

[52] U.S. Cl. .................................... 414/303; 414/408; 414/420

[58] Field of Search ............... 414/403, 404, 406, 420, 414/408, 303, 419

[56] References Cited

U.S. PATENT DOCUMENTS 4,305,693 12/1981 Naab .............................. 414/408 X
4,613,271 9/1986 Naab .............................. 414/408 X

FOREIGN PATENT DOCUMENTS 1201756 9/1965 Fed. Rep. of Germany ...... 414/408
1240776 5/1967 Fed. Rep. of Germany .
1266213 4/1968 Fed. Rep. of Germany .
2654542 6/1978 Fed. Rep. of Germany .
2854764 7/1980 Fed. Rep. of Germany ...... 414/408
3319644 12/1984 Fed. Rep. of Germany .
292866 11/1988 Fed. Rep. of Germany ...... 414/408

*Primary Examiner*—Robert P. Olszewski
*Assistant Examiner*—Keith L. Dixon
*Attorney, Agent, or Firm*—H. Gibner Lehmann; K. Gibner Lehmann

[57] ABSTRACT

An improved lifting and tilting device for emptying garbage containers into the pour-in opening of a garbage truck. The device comprises a quadrangle of joints of a collapsible frame which carries the container during the emptying process. An upper bar of the quadrange is coupled to a swivel drive while another member of the quadrangle can grip and support the garbage container. Through appropriate locking devices the quadrangle becomes a quasi-rigid unit with the gripped container to effect the emptying, said quasi-rigid unit being dissolved only during the downward swivel motion of the upper bar prior to putting the container down.

33 Claims, 12 Drawing Sheets

LIFTING AND TILTING DEVICE FOR EMPTYING CONTAINERS INTO A GARBAGE COLLECTOR

CROSS REFERENCES TO RELATED APPLICATIONS

The present application claims priority under 35 USC 119, of West German Application No. P 38 30 227.6 filed Sept. 6, 1988.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

Field of the Invention

This invention relates to lifting and tilting devices for emptying containers into the pour-in openings of collection tanks, in particular for emptying garbage containers into the collection tanks of garbage trucks.

Description of the Related Art Including Information Disclosed Under 37 CFR §§1.97-1.99

In known devices of this type there is a quadrangle of joints with an upper and a lower guide bar which, while forming the four joints, are connected to a lifting and tilting frame that accepts the containers to be emptied and retains them during the emptying process until the emptied containers are finally put down, and connected to a rear, articulated lever which is opposite said lifting and tilting frame, there being provided a controlled power drive mechanism inserted between the upper guide bar of the quadrangle of joints and the collection tank for the generation of the lifting and tilting motion.

In lifting and tilting devices of this kind as known from German Patents Nos. 12 01 756 and 12 40 776, a quadrangle of joints carrying the lifting and tilting frame is fastened to a swivel arm that is mounted so as to swivel about a horizontal axis, the lifting motion of the lifting and tilting frame relative to the swivel arm being generated by a cylinder/piston arrangement and by swivel motion of the swivel arm about its horizontal swivel shaft, as effected by a swivel drive.

It is also known from German Patent No. 26 54 542 and German Provisional Patent No. 12 66 213 to provide, in lifting and tilting devices of this kind, a single cylinder/piston arrangement for the generation of the lifting motions as well as the tilting motions, this cylinder/piston arrangement being adapted to engage the lower, or selectively also the upper guide bar according to German Patent No. 26 54 542, and the upper guide bar according to German Provisional Patent No. 12 66 213. According to both publications, the other end of the cylinder/piston arrangement is supported by the collection tank or by elements fastened to the collection tank.

The design according to German Patents Nos. 12 01 756 and 12 40 776 requires two separate drive mechanisms and control devices to safeguard the work cycle and its proper sequence, causing considerable equipmental expense and, in the lifting and tilting devices according to German Patents Nos. 26 54 542 and 12 66 213 it is impossible to design the lifting and tilting device as one complete unit to be mounted as such on the collection tank because the hinged support of the cylinder/piston arrangement on the collection tank represents an additional mounting point which needs to be coordinated with the position of the swivel arm shaft.

In the lifting and tilting device disclosed in German Publication No. 33 19 644, the rear articulated lever, opposite the lifting and tilting frame in the quadrangle of joints, is also designed as a swivel arm extending upwardly beyond the quadrangle of joints and mounted so as to swivel around a horizontal shaft below the pour-in opening. In this case, the drive mechanism for the lifting and tilting device consists of a cylinder/piston arrangement with a telescoping cylinder hinged at its lower end to the lifting and tilting frame and at its upper end to a bracket firmly mounted on the collection tank. The thus designed drive mechanism is disposed on the wall surface outside of the areal extent of the pour-in opening. Accordingly, the drive mechanism designed as a telescoping cylinder extending along the operating range of the switching and control devices of the lifting and tilting device, thereby endangers the operating personnel to a greater extent. Moreover, the drive mechanism designed as a telescoping cylinder is expensive and complicated.

Due to the prior design of the rear, articulated lever opposite the lifting and tilting frame as a swivel arm that is hinged to the collection tank and that extends above the quadrangle of joints, the pour-in opening is covered relatively little by the circular arc of travel of the container to be emptied, in all of the above cited, known lifting and tilting devices. Therefore, the container rim is guided over the edge of the pour-in opening barely above the swivel arm shaft. For this reason a tilted chute wall going into the interior of the collection tank is required, across which the material dropping out of the container slides into the collection tank interior.

SUMMARY OF THE INVENTION

The above disadvantages and drawbacks of prior lifting and tilting devices are obviated by the present invention which has for an object to create a much improved lifting and tilting device of the above type for emptying containers, which makes it possible, with the least equipmental expense, to cover the pour-in opening broadly by the travel movement of the container to be emptied, thus enabling the pouring of the container contents directly into the collection tank. At the same time, it is desired that the lifting and tilting device represent one compact unit which can be mounted simply, and with little space requirements in the pour-in opening area.

According to the invention, these problems are solved in that the drive mechanism is constituted as a swivel drive that is mounted in the pour-in opening area and that the upper guide bar is drivingly connected to the swivel drive, while the rear, articulated lever of the quadrangle of joints forms a supporting arm which is also linked to the swivel drive and, in its initial position, is in contact with a stop that is mounted in the pour-in opening area.

Due to constructing the drive mechanism as a swivel drive and directly coupling the upper guide bar thereof to the swivel drive, the efficiency of the power transmission from the drive mechanism to the upper guide bar is considerably improved on the one hand, and the coverage of the pour-in opening by the circular arc of travel of the container to be emptied is increased substantially on the other hand. Only the rear articulated lever and the lower guide bar continue to assume guiding and supporting functions for the lifting and tilting frame and for the container received by it. In addition, the device according to the invention distinguishes itself by its well arranged design and great operational safety.

In a preferred embodiment of the invention, the upper guide bar and the supporting arm are mounted so as to swivel coaxially in the swivel drive area, the upper guide bar being coupled to the drive mechanism through the common swivel axis formed by the coaxial mounting, whereas the supporting arm is mounted so as to swivel freely within a fixed swivel range. In this embodiment, the lifting and tilting device according to the invention can be arranged to particular advantage as a single compact unit requiring only a single mounting spot, namely the place where the swivel drive is attached in the pour-in opening area. The swivel drive can be disposed, for instance, in the area of at least one vertical, lateral edge of the pour-in opening. This arrangement offers the advantage that the lifting and tilting device, in its initial position, virtually leaves the entire pour-in opening free so that materials not brought to it in containers, such as bulky objects or filled garbage bags, can enter the pour-in opening unhindered.

By mounting the swivel drive in the area of at least one vertical side edge of the pour-in opening, safe emptying of containers carried by the lifting and tilting frame can be assured in a particularly simple manner in that the upper guide bar has a fixed support leg which extends essentially horizontally and parallel to the plane of the pour-in opening and on which leg the lifting and tilting frame is mounted so it can swivel, while forming one of the four joints of the quadrangle of joints. Advantageously, the support leg can extend cantilevered in the manner of a crank to the upper guide bar laterally with respect to the pour-in opening area. Also, the support arm can be mounted on the same vertical side edge of the pour-in opening as the upper guide bar and, in its lower area and initial position, can be extended at an angle towards the center of the lifting and tilting frame. The support arm can also be equipped with a stop defining the lower limit of the swivel range and containing at the same time, the components for the swivel mount of the lower guide bar forming one of the four joints. The support arm stop and the lower guide bar should preferably lie essentially in the center plane of the lifting and tilting frame, parallel to the direction of motion. This assures that the lifting and tilting frame is particularly stable in its initial position, that the containers to be emptied are accepted by the lifting and tilting frame with particular reliability, and that the accepted containers are safely guided during the emptying process.

Another substantial improvement in the container guidance during the emptying process is achievable if the quadrangle of joints, whose one joint is located in the swivel drive area, is brought, in the course of the upward motion of the upper guide bar, into a more or less wide open, mutual position of the four articulated levers and is locked in such a position to prevent further mutual swiveling of the parts of the quadrangle of joints. This can be accomplished within the scope of the invention, in that a limiting device is provided which becomes effective in the course of the upward motion of the upper guide bar and prevents the quadrangle of joints from swiveling further relative to each other. In its simplest form, this limiting device can contain two stops which strike each other in the course of the upward motion of the upper guide bar, one of which is disposed on the upper guide bar and the other on the lifting and tilting frame. The limiting device can be designed to be adjustable in order to be able to set the lifting stroke or the point of transition from the lifting to the tilting operation.

There can further be provided a lock for the quadrangle of joints which becomes effective in the course of the upward motion of the upper guide bar and locks the lifting and tilting frame and the upper guide bar in a predetermined position as the upward motion continues. This causes the quadrangle of joints to become a quasi-rigid structure during the tilting process, its articulated levers being arrested in their predetermined position. In a particularly simple embodiment, this additional lock of the quadrangle of joints can contain a controlled locking hook which holds the stops together. For example, the locking hook can be mounted so as to swivel into and out of its effective position and have a gravity controlled or driven arm to bring about its swivel motion.

As a further complement there can be provided within the scope of the invention a mechanism which locks the accepted container to the lifting and tilting frame in the course of the upward motion of the upper guide bar, and which is actuated by virtue of the mutual swiveling motion of the parts of the quadrangle of joints. In a preferred embodiment, this container locking mechanism has a locking bar which can be swung across the container rim. To actuate it, the locking mechanism can contain, for instance, an operating mechanism having at least one roller, and lifters disposed on the lifting and tilting frame and on the upper guide bar. The locking device for the operating mechanism can also have a linkage provided on one of the guide bars. For example, the container locking mechanism can also have a single-armed lever which pivots about a horizontal shaft, supports the locking bar and can pivot, countering the force of a return mechanism, into locked position by means of an operating element mounted on the upper guide bar of the four joint arrangement. A safety device can be provided, retaining the single-armed lever and/or its operating element in locked position as long as the four joint arrangement is in an upper operating position.

As a further complementary mechanism, a hold-back lock for the support arm can be provided, which can be designed to be releasable by solely the relative motion of the parts of the quadrangle of joints after these parts have left their lower range of motion during the upward swing. This hold-back lock prevents the support arm from undesirably swinging up at the beginning of the upward motion cycle, which could otherwise lead to an undesired swivel motion of the four joint arrangement into a distended state. Such swiveling of the four joint arrangement into a distended state could cause the container to be emptied being pushed away in front of the lifting and tilting frame instead of being accepted by it. To form this hold-back lock there can be provided on the equipment frame, a spring-mounted hold-back hook spanning a part of the support arm and, on the lower guide bar of the four joint arrangement, an actuating cam to lift the hold-back hook out.

The lifting and tilting device according to the invention can be designed as a single dumping device But further developed embodiments are possible, namely in the form of two juxtaposed, single dumping devices or in the form of a twin arrangement, the latter being settable selectively to operation independent of each other or to joint operation of the two lifting and tilting devices.

For example, in a further developed embodiment of the lifting and tilting device according to the invention, two lifting and tilting devices can be mounted in mirror image in the area of a pour-in opening, one each to each vertical side edge of the pour-in opening. The grippers for the containers to be emptied, provided on the lifting and tilting frames of the two lifting and tilting devices, can be mutually coordinated in such a manner that smaller containers can be accepted by just one lifting and tilting frame and larger containers jointly by both lifting and tilting frames, and that the swivel drives of both lifting and tilting devices can be selectively switched on to work synchronously, or separately. In another further developed embodiment of the lifting and tilting device according to the invention, the upper guide bar can be formed of two parallel guide bar levers and one support arm extending essentially horizontally and parallel to the plane of the pour-in opening between the two guide bar levers which are pivotably mounted on one vertical side edge of the pour-in opening each, the support arm or the lifting and tilting frame mounted on it extending essentially across the entire width of the pour-in opening. To drive such a further developed lifting and tilting device according to the invention it can be provided that only one of the guide bar levers of the upper guide bar is connected to a swivel drive while the second guide bar lever is mounted so as to swivel freely. But it is also possible that both guide bar levers of the upper guide bar can each be connected to a swivel drive, and both swivel drives can be equipped with a joint control. In this latter arrangement, a better, symmetrical power flow from the swivel drives to the lifting and tilting frame is achievable.

Since, within the scope of the invention, the support arm and the lower guide bar perform only guide and support functions, there may yet be provided in a further developed embodiment of the lifting and tilting device according to the invention, a lifting and tilting frame extending across the width of the pour-in opening, one support arm which is common to both guide bar levers, and one common lower guide bar. The common support arm can be mounted on a vertical side edge of the pour-in opening, while the common lower guide bar is disposed essentially in the vertical center plane of the pour-in opening.

The lifting and tilting devices according to the invention can be mounted to the back side of the collection tanks of garbage trucks, similar to conventional lifting and tilting devices. Due to the special design of the lifting and tilting devices according to the invention, however, its use in side-loader garbage trucks is also possible, be it in the embodiment as a single lifting and tilting device or in the one or the other further developed embodiments When the lifting and tilting devices according to the invention are used in side-loader garbage trucks it is preferred that the drive shaft of the swivel drive be mounted at a level above the lower rim of the pour-in opening and offset inwardly relative to the outside vehicle edge so that, in their initial positions, all parts of the lifting and tilting device are located behind the outside edge of the vehicle.

Other features and advantages will hereinafter appear.

BRIEF DESCRIPTION OF THE DRAWINGS

Embodiments of the lifting and tilting device according to the invention are explained in greater detail below with reference to the drawings, in which.

DESCRIPTION OF THE PREFERRED EMBODIMENTS

Figure 1:
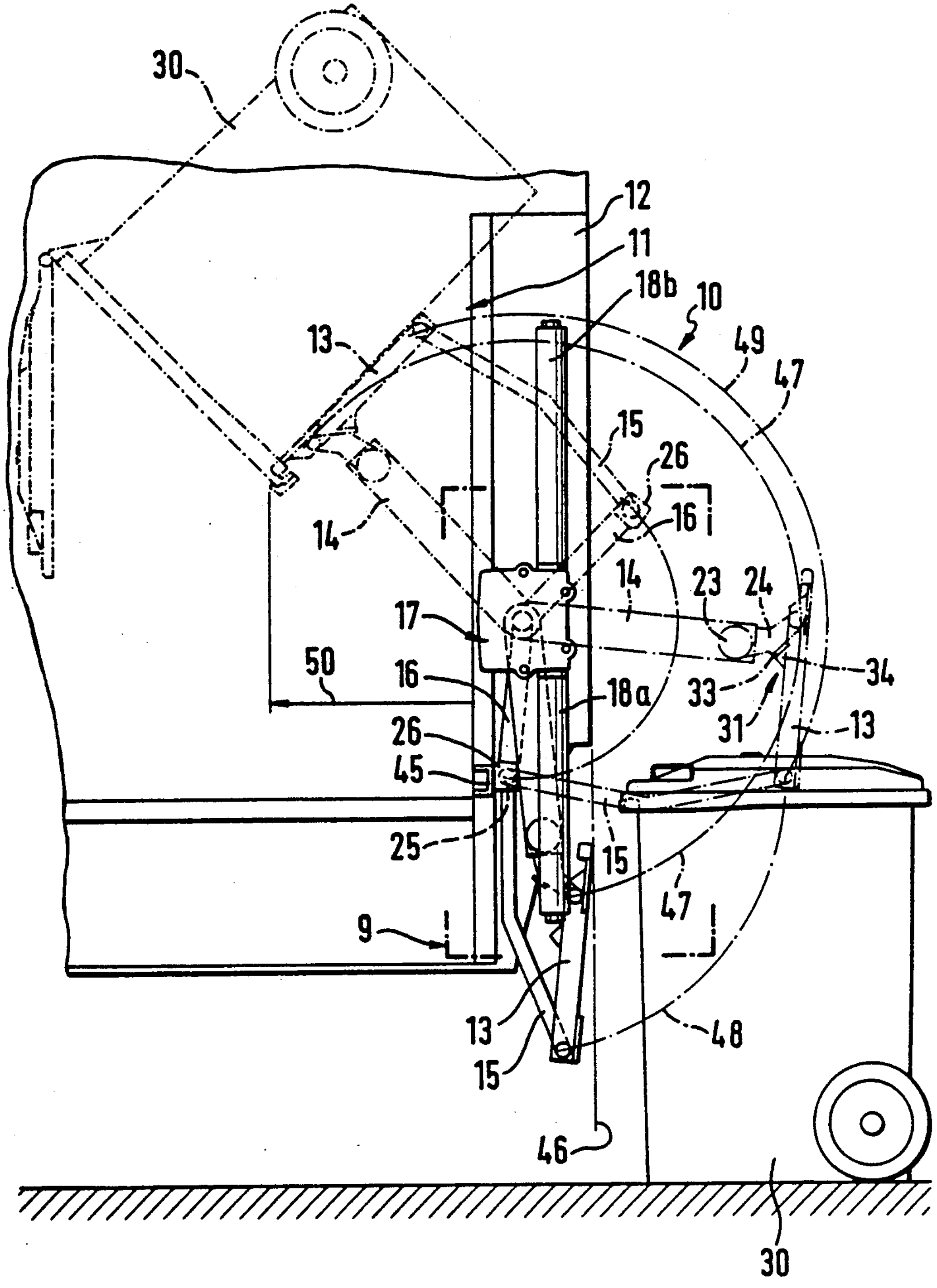
FIG. 1 shows a side view of an embodiment of the lifting and tilting device according to the invention for a side-loader garbage truck with the initial position, the transitional position between lifting process and tilting process, and the dumping, end position being indicated.

The example of FIGS. 1 through 4 involves a lifting and tilting device 10 mounted at the pour-in opening 11 of a side-loader garbage truck. The lifting and tilting device 10 has a quadrangle of joints consisting of a lifting and tilting frame 13, an upper guide bar 14, a lower guide bar 15, and a support arm 16. The parts 13, 14, 15 and 16 form a collapsible and extendible, four-legged frame having a configuration similar to a parallelogram, with pivots at the four corners. A swivel power drive 17 with upper and lower cylinder/piston arrangements 18*a* and 18*b* and rack and pinion gearing 19 with a drive shaft 20 is installed between the quadrangle of joints and actuated by the two cylinder/piston arrangements 18*a* and 18*b* that serve as the powering mechanism for the lifting and tilting device. The upper guide bar 14 is coupled to the drive shaft 20. Mounted so as to rotate freely on the drive shaft 20, and hence rotate coaxially with the upper guide bar 14, is the support arm 16. Thus, the swivel drive 17 together with the quadrangle of joints forms one compact unit, to be mounted in the area of the pour-in opening 11. In the example illustrated, this mounting is accomplished by fastening the swivel drive 17 to a vertical edge 21 of the pour-in opening 11 (to an appropriate stiffening part not shown, provided there).

Figure 2:
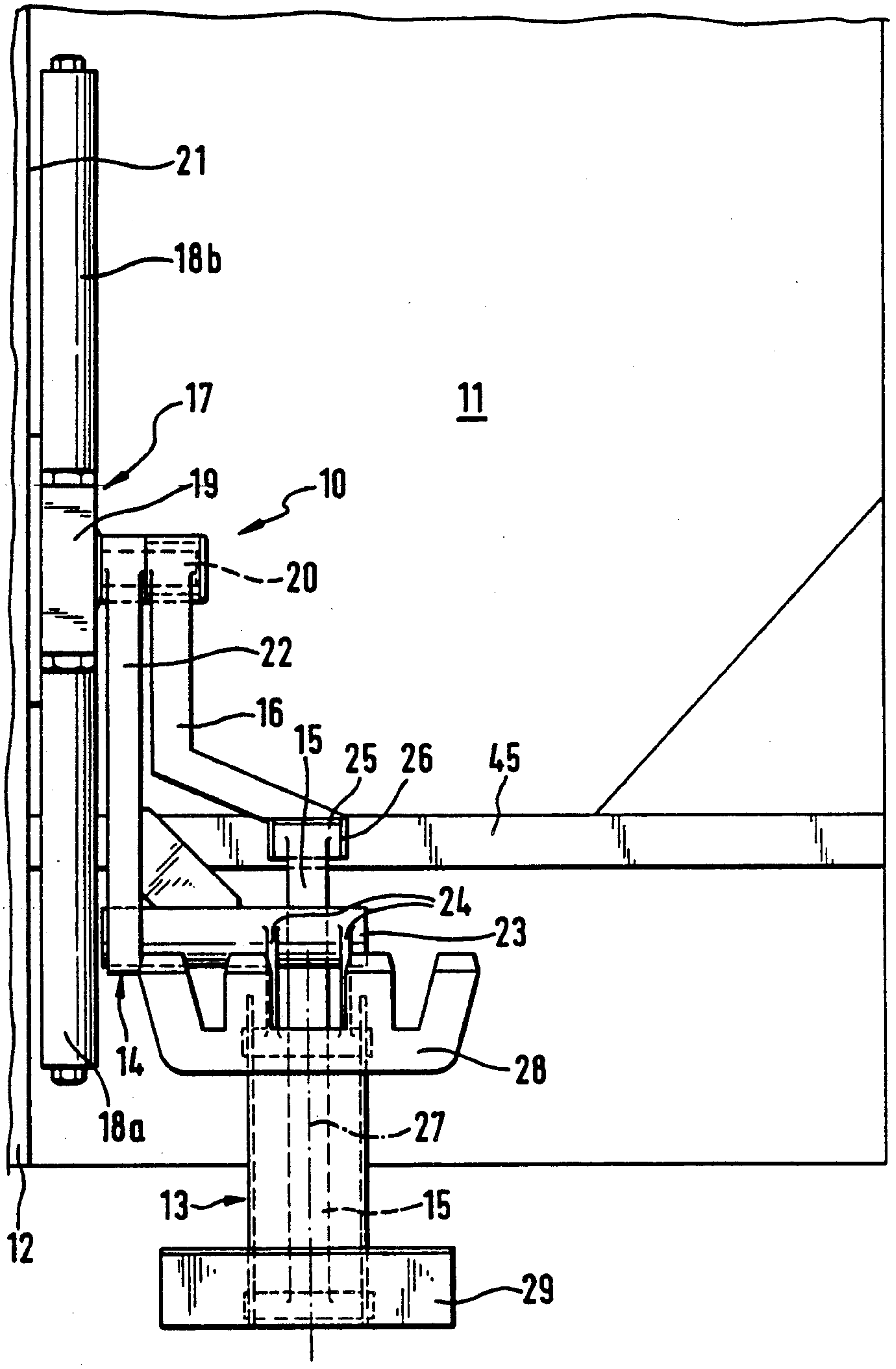
FIG. 2 is a lateral top or plan view of the lifting and tilting device according to FIG. 1.

The upper guide bar 14 has a guide bar lever portion 22, one end of which is mounted on the drive shaft 20 of the swivel drive 17. The other end of the guide bar lever portion 22 has a support leg 23 which is of tubular design and fixed to the guide bar lever portion 22. As FIG. 2 shows in particular, the guide bar lever portion 22 extends in the lateral area of the pour-in opening 11 at a slight distance next to the swivel drive 17, while the support leg 23 extends crank-like and cantilevered from the guide bar lever portion 22 laterally to the area of the pour-in opening 11. Attached to the support leg 23 are two bearing brackets 24 to which the upper part of the lifting and tilting frame 13 is linked, to form one of the four joints of the quadrangle of joints. The lower part of the lifting and tilting frame 13 is linked to the free end of the lower guide bar 15 whose other end is hinged in turn to the lower end of the support arm 16 in the example shown. This articulated connection 25 between the lower guide bar 15 and the support arm 16 is constituted at the same time as an abutment or stop 26 which functions to set the lower limit of the swivel range of the support arm 16.

The upper portion of the support arm 16 runs from its bearing point on the drive shaft 20 alongside the lever 22 of the upper guide bar 14 and extends at an angle in such a manner that the joint 25 formed at its lower end and the lower guide bar 15 lie in the center plane 27 of the lifting and tilting frame 13.

The lifting and tilting frame 13 is provided with a carrier or support beam 28 and an abutment 29 for the container to be emptied, such as a garbage can 30.

Figure 3:
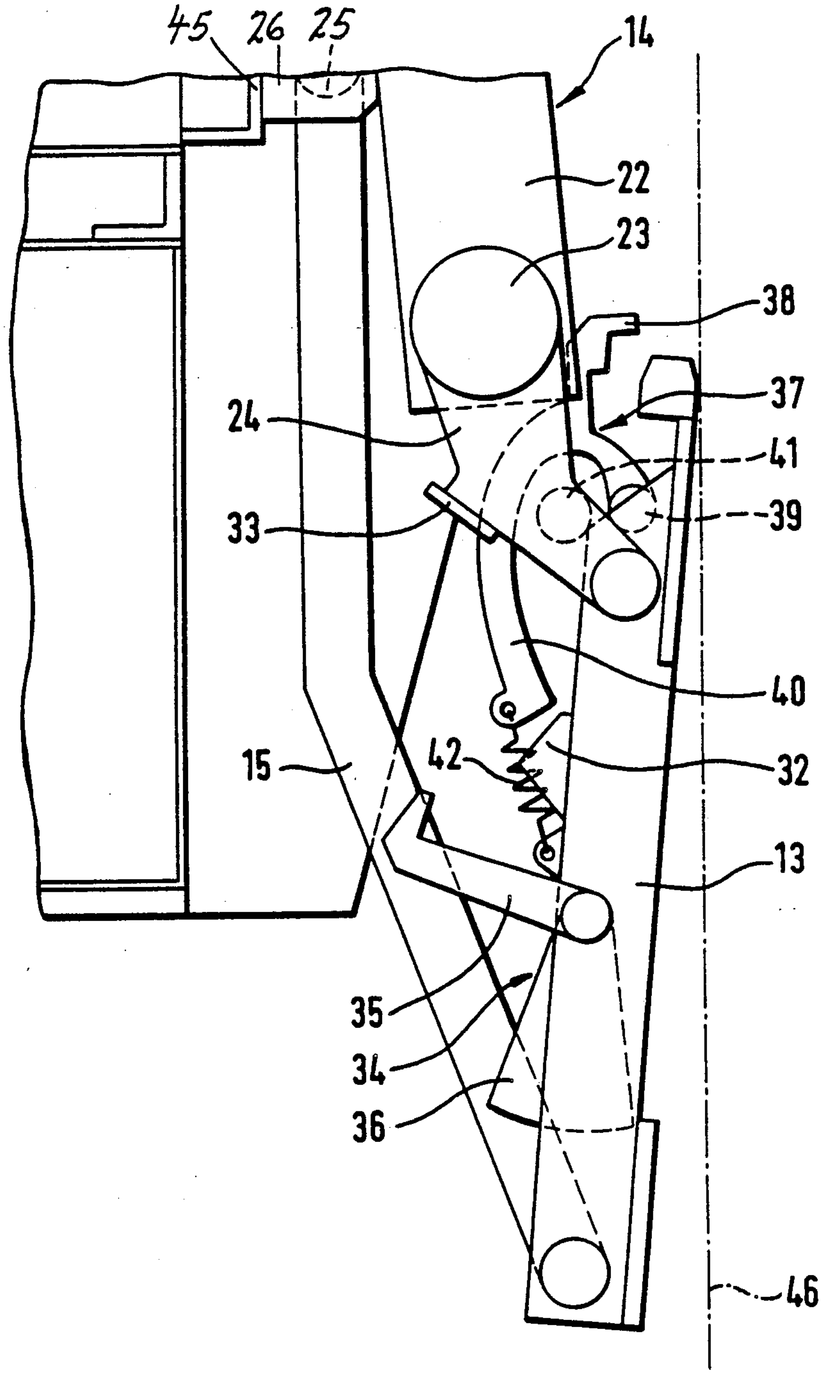
FIG. 3 is an enlarged side elevational view of the lifting and tilting frame and of parts of the upper and lower guide bars with locking mechanisms mounted thereto, in their initial positions.
Figure 4:
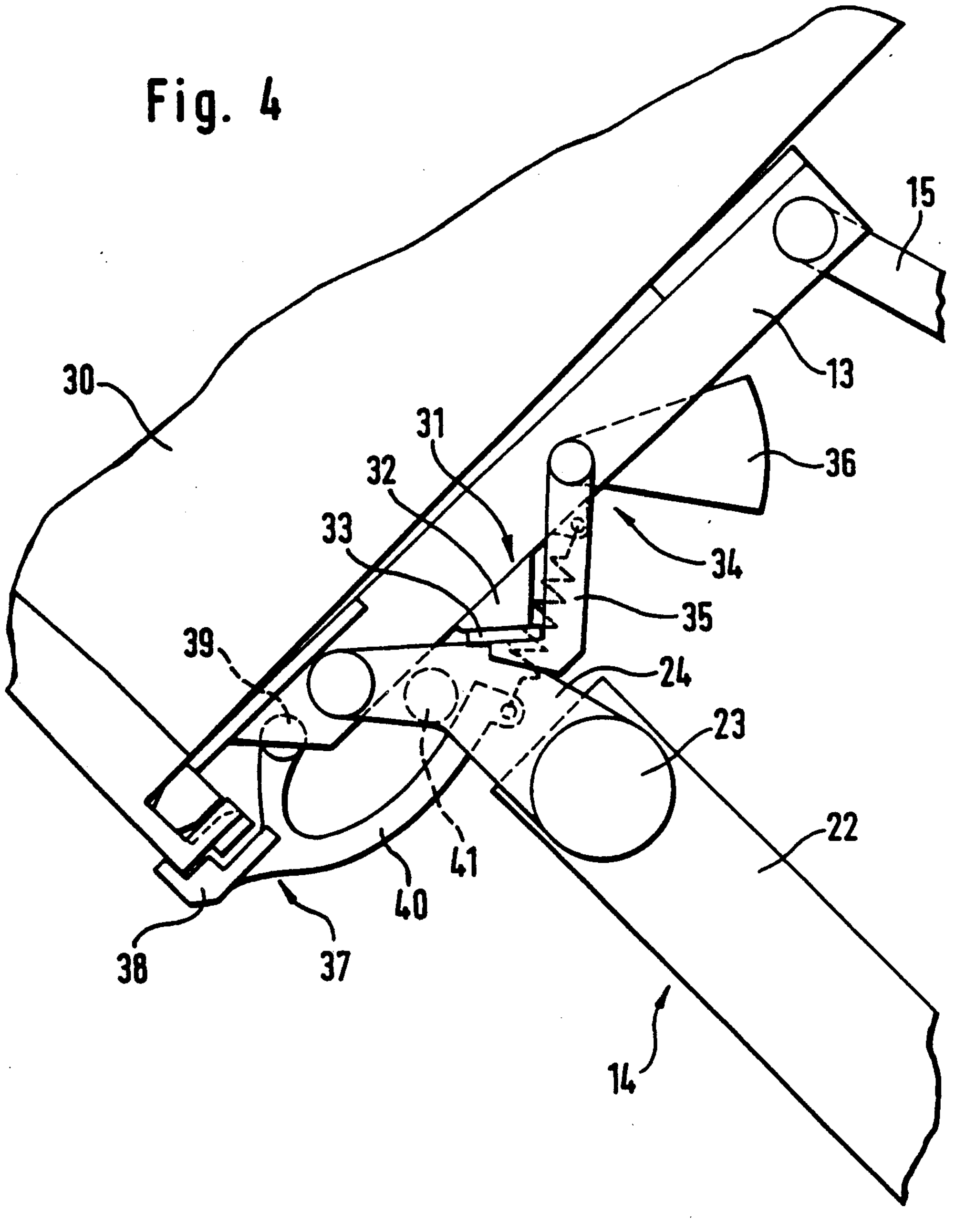
FIG. 4 is an enlarged side elevational view of the lifting and tilting frame in its dumping end position.

As FIGS. 1, 3 and 4 show, a limiting device 31, effective in the quadrangle of joints, is provided which becomes active in the course of the upward motion of the upper guide bar 14 and which prevents the parts of the quadrangle of joints from moving further relative to each other This limiting device 31 contains a block-shaped stop 34, FIG. 4, mounted on the lifting and tilting frame 13 and a plate-shaped stop 33 mounted on at least one of the bearing brackets 24. As FIG. 1 shows, the two stops 32 and 33 meet in a half-way swivel position of the upper guide bar 14, i.e. in a half-way raised position of the lifting and tilting frame 13, thereby preventing the parts of the quadrangle of joints from moving further relative to each other in their four joints as the upper guide bar 14 continues its upward motion. In order to be able to change or set the respective half-way swivel position of the upper guide bar 14, the one or the other of the two stops 32, 33 can be designed to be adjustable.

Interacting with the limiting device 31 there is provided an additional lock 34 for the quadrangle of joints which, in the example illustrated, contains a locking hook 35 that, after the two stops 32 and 33 have met, retains the plate-shaped stop 33 of the guide bar 14 on the block-shaped stop 32 of the lifting and tilting frame 13. To do so, the locking hook 35 is mounted so as to pivot about a horizontal pin on the lifting and tilting frame 13, and carries a gravity controlled or driven arm 36.

Further provided in the quadrangle of joints is a container-locking mechanism 37 which is moved into locking position by the movement of the parts of the quadrangle of joints relative to each other in the course of the upward motion of the upper guide bar 14. In the example of FIGS. 3 and 4, a locking bar 38 is mounted so as to turn about a horizontal pin 39 on the lifting and tilting frame 13 and swing across the container rim, and its backside is provided with a curved actuating cam 40. Mounted on the upper guide bar 14, in the present example specifically on at least one of the bearing brackets 24, is an actuating roller 41 which is engaged by the actuating cam 40 during the motion of the upper guide bar 14 and the lifting and tilting frame 13 relative to each other and which swings the locking bar 38 across the rim of the container 30 to be emptied, countering the force of a return spring 42.

Figure 5:
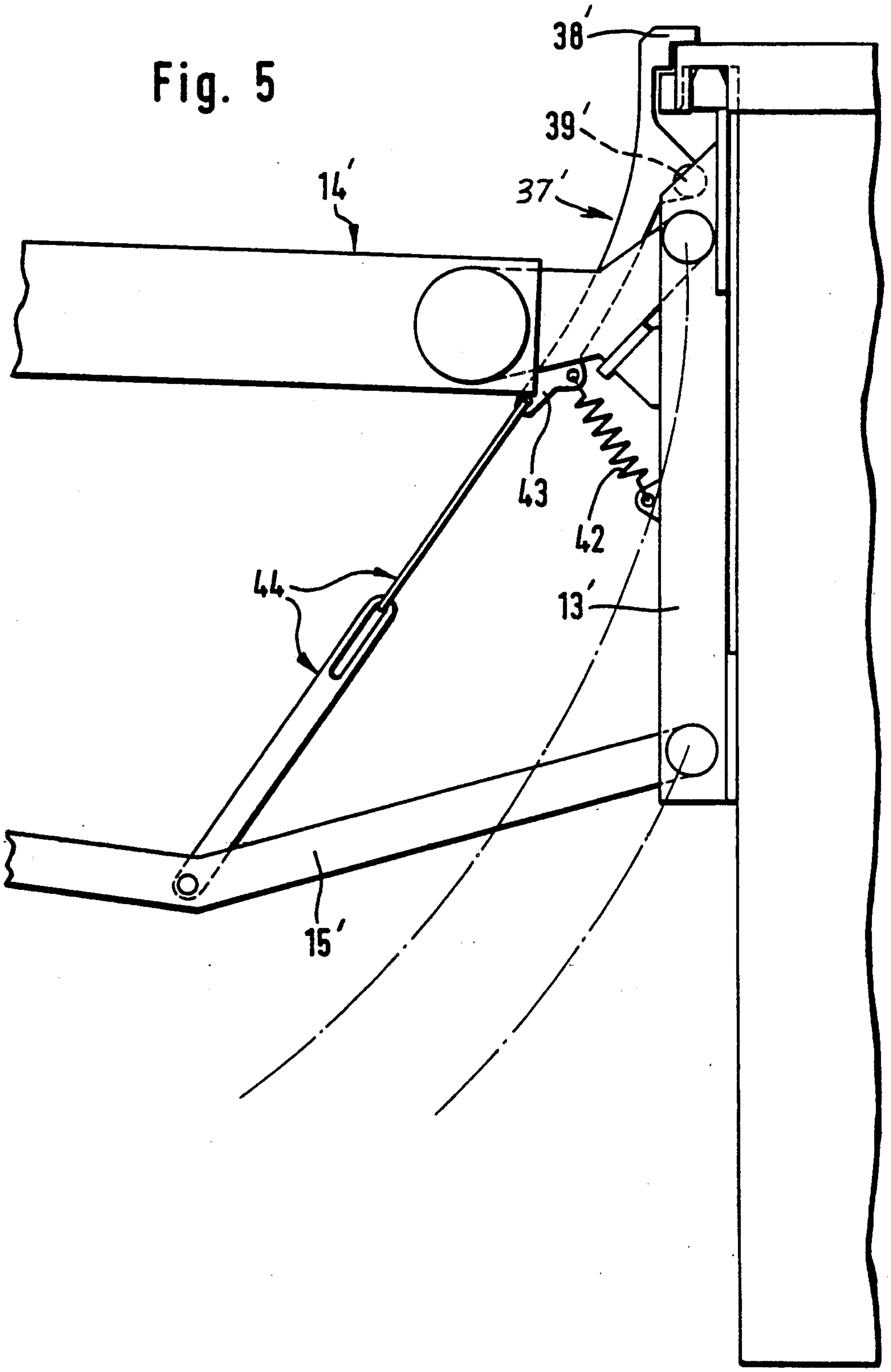
FIG. 5 is a schematic representation of a modified embodiment of the locking mechanism for the container to be emptied, in side elevational view.

As indicated in FIG. 5, the cam 40 and the actuating roller 41 can also be replaced by an actuating lever 43 which is connected to a pulling linkage 44 engaging, for instance, the lower guide bar in order to pull the locking bar 38 into its locking position in the extended position of the parts of the quadrangle of joints.

The operating mode of the lifting and tilting device according to the invention is as follows:

In its initial position (FIGS. 1 through 3) the upper guide bar 14 is swung down. The support arm 16 is also swung down and its stop 26 is in contact with a stop 45 which, in the example illustrated, extends across the entire width of the pour-in opening 11 along the latter's lower edge. From the joint 25 at the stop 26, the lower guide bar 15 extends downwardly to the lower joint of the lifting and tilting frame 13. As FIG. 1 shows, this causes the parts of the quadrangle of joints to be positioned relative to each other so that the quadrangle of joints is collapsed and all parts of the lifting and tilting device are retracted behind the outer edge 46 of the collection tank 12 of the garbage truck.

A container 30 to be emptied is brought to the garbage truck tank 12 in the position shown in FIG. 1 and placed there. When actuating the lifting and tilting device, pressure medium is fed to the cylinder/piston arrangement 18*a* of the swivel drive 17. The upper guide bar 14 is power swiveled upwardly This causes the lifting and tilting frame 13 to be raised out of its initial position and guided with its upper joint along the circular track 47 extending around the swivel axis of the upper guide bar 14 and with its lower joint along the circular track 48 extending around the joint 25, until the lifting and tilting frame 13 engages the upper rim of the container 30, accepting the same. As the comparison of the two circular tracks 47 and 48 demonstrates, the lifting and tilting frame 13 is maintained, during this motional phase, in a position that is almost vertical, but slightly tilted towards the container 30, until the upper guide bar 14 attains a roughly central swivel position indicated in FIG. 1. In this position, the stops 33 and 32 respectively on the upper guide bar 14 and the lifting and tilting frame 13 meet, thereby preventing any further relative movement between the following: the upper guide bar 14, the lower guide bar 15, the lifting and tilting frame 13, and the support arm 16. The stops 32 and 33 are initially held together by the weight of the container 30, the lifting and tilting frame 13, and the lower guide bar 15. As the upward swing continues, however, the locking hook 35 is pivoted under the action of its gravity driven arm 36, so that it engages the plate-shaped stop 33 on the upper guide bar 14, thus positively preventing separation of the stops 32 and 33 during the continued upward motion of the upper guide bar 14.

As soon as the upper guide bar 14 approaches its half-way swivel position indicated in FIG. 1, the actuating roller 41 runs over the cam 40 due to the relative pivoting motion of upper guide bar 14 and lifting and tilting frame 13, thereby swinging the locking bar 38 across the upper rim of the container 30, flexing the return spring 42 in the process (FIGS. 3 and 4).

Thus, during the continued upward motion of the upper guide bar 14, the lower guide bar 15, the lifting and tilting frame 13 including the container 30 locked to it and the support arm 16 are all swung into the final dumping position as a quasi-rigid unit. This unit pivots about the pivotal axis of the upper guide bar 14 so that the further path of motion of the lower joint on the lifting and tilting frame 13 is also a circular track 49 prescribed around the pivotal axis of the upper guide bar 14.

As FIG. 1 shows, the rim of the opening of container 30 with its dumping area is swung into the interior of the collection tank 12 by a dimension 50. This dimension 50 obtained with the lifting and tilting device is so great that dumping chutes or other auxiliary aids to conduct the container contents into the interior of the collection tank 12 are not needed at the pour-in opening 11.

The container 30 to be emptied can be shaken by short back and forth motions of the upper guide bar 14. But this shaking does not unlock the above described locking systems The quadrangle of joints rather remains rigid in itself, and the container 30 remains locked to the lifting and tilting frame 13.

By admitting pressure medium to the cylinder/piston arrangement 18*a* the upper guide bar 14 is swung back In the halfway swivel position indicated in FIG. 1 the locking hook 35 releases the plate-shaped stop 33, and the stops 32 and 33 thereafter move apart from each other During the further downward motion of the upper guide bar 14, the lifting and tilting frame 13 is pushed down into an essentially vertical position, slightly inclined towards the emptied container; it places the container 30 on the ground, then releases the container and moves back behind the outer edge 46 of the vehicle.

In the variant according to FIG. 5, as the upper guide bar 14' approaches its half-way position indicated in FIG. 1, the actuating lever 43 of the locking bar 38' is pulled away from the lifting and tilting frame 13' by the linkage 44 on the lower guide bar 15' against the force of the return spring 42. This causes the locking bar 38' to swing about its pin 39' into a locking position. When the upper guide bar 14', after the container is emptied, goes below its half-way position, corresponding to one of the positions of FIG. 1 and during its return motion, the distance between the upper part of the lifting and tilting frame 13' and the lower guide bar 15' becomes smaller. The linkage 44 loosens and permits the locking bar to return to its unlocked position due to the force of the return spring 42. In the embodiment according to FIG. 5, a locking system for the quadrangle of joints is provided in the same manner as in the example of FIGS. 3 and 4, but this is not shown for the sake of clarity.

Figure 6:
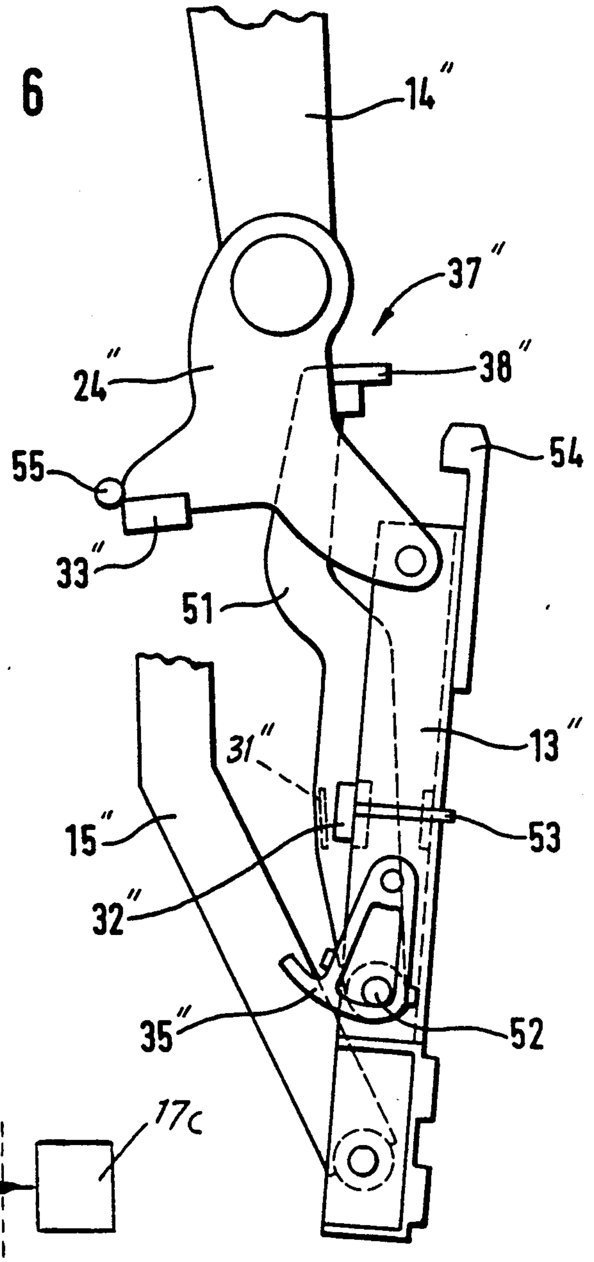
FIG. 6 is a schematic representation of a preferred embodiment of the locking mechanism for the container to be emptied, in side elevational view in the lower operating position of the lifting and tilting device.
Figure 7:
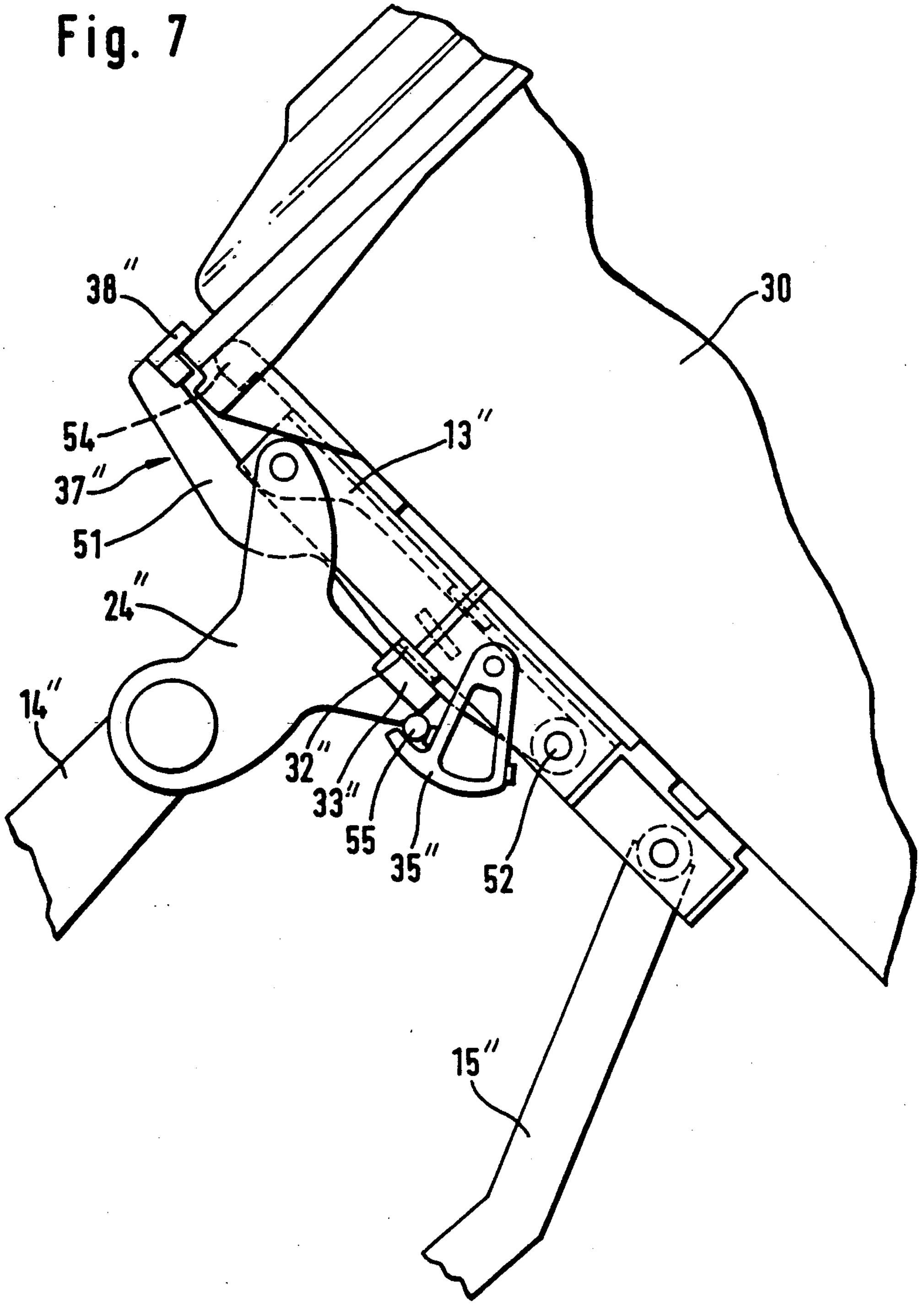
FIG. 7 shows the locking mechanism of FIG. 6 in the raised position of the lifting and tilting device.
Figure 8:
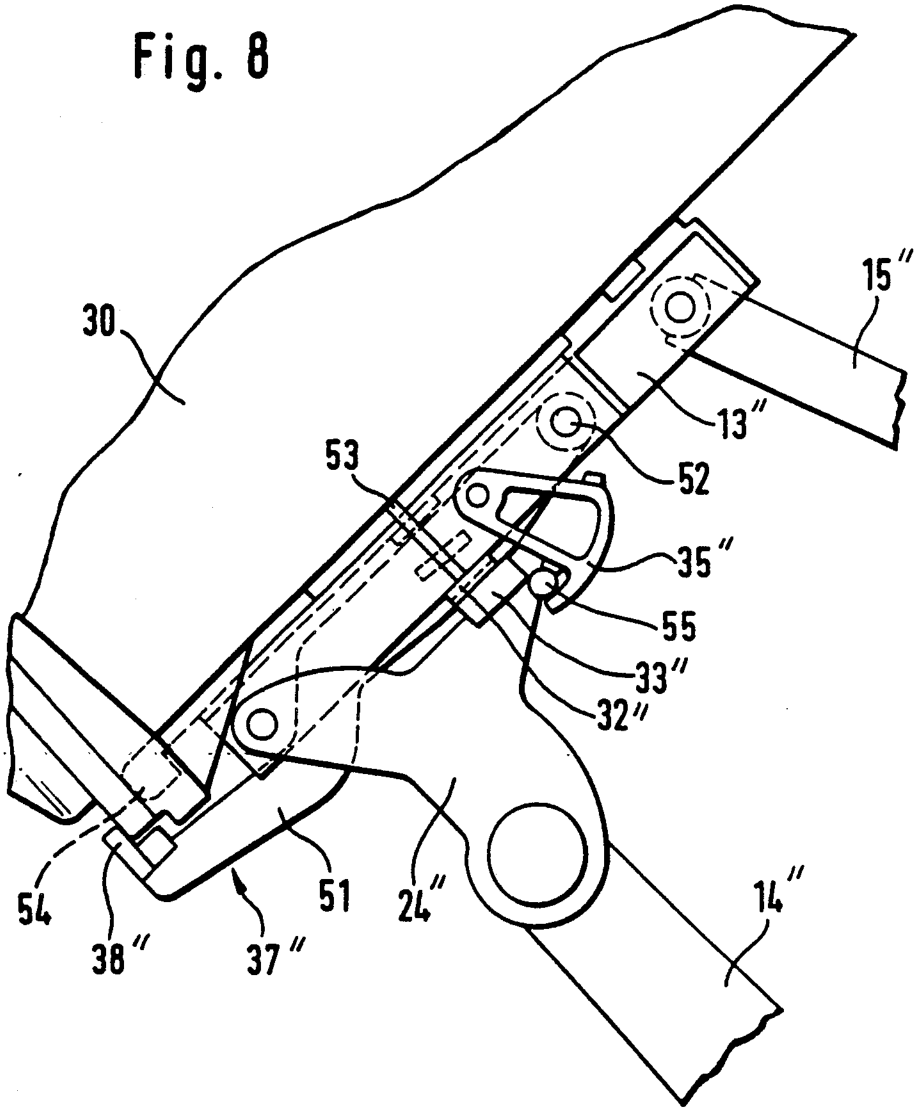
FIG. 8 shows the locking mechanism of FIGS. 6 and 7 in the dumping, end position of the lifting and tilting device.

Shown in FIGS. 6 through 8 is a preferred embodiment of the locking system 37'' in the lower initial position, in a position raised half-way, and in the dumping end position of the lifting and tilting device, respectively. In this embodiment, the locking system 37'' has a single-armed lever 51, one end of which is mounted on the lifting and tilting frame 13'' so as to pivot about a horizontal pin or shaft 52 and support a locking bar 38'' at its free end By means of a return mechanism indicated at 53, in particular a spring loaded return mechanism, the single-armed lever 51 is kept in its unlocked position fixed by a limiting device, in which it is swung back so far in relation to the lifting and tilting frame that the locking bar 38'' clears the seating elements 54 for the securement and release of a container provided on the lifting and tilting frame 13''. Similar to the examples of FIGS. 1–4 the free end of the upper guide bar 14'' supports a bearing bracket 24'' which is provided with a stop 33''. As in the example of FIGS. 1 through 4, the stop 33'' is arranged so that it will make contact with the stop 32'' mounted on the lifting and tilting frame 13'' in order to limit the movement of the upper guide bar 14'' and of the lifting and tilting frame 13'' relative to each other In the example of FIGS. 6 through 8, however, the stop 33'' of the upper guide bar 14'' is designed so that it goes beyond the stop 32'' of the lifting and tilting frame 13'' and, before meeting the latter stop 32'', strikes the single-armed lever 51 disposed next to it. In the succeeding phase of motion of upper guide bar 14'' and lifting and tilting frame 13'', the single-armed lever 51 is swung forward, countering the action of its return device 53, by the stop 33'' in relation to the lifting and tilting frame 13'' until the rear edge of the single-armed lever 51, or a stop 31'' mounted on it, lies in the rear plane of the stop 32'' and the stop 33'' supports itself on the stop 32''. This mutual position of the two stops 32'' and 33'' and of the single-armed lever 51 is shown in FIGS. 7 and 8. In the forward position of the single-armed lever 51 in relation to the lifting and tilting frame 13'', the locking bar 38'' is moved into locking position across the seating elements 54 of the lifting and tilting frame 13'' and across the rim of a container or garbage can 30 being handled by the lifting and tilting frame 13''. When the two stops 32'' and 33'' are separated from each other again, the return mechanism 53 will effect the swingback of the single-armed lever 51 and with it, the return of the locking bar 38'' into its unlocked position.

Similar to the example of FIGS. 3 and 4, a locking and safety hook 35'' is mounted on the lifting and tilting frame 13'' so as to pivot about a horizontal pin and is also provided with a gravity driven arm in the embodiment according to FIGS. 6 to 8. As FIGS. 7 and 8 show in particular, this locking and safety hook 35'' moves out of its initial position shown in FIG. 6 during the upward swing of the lifting and tilting frame 13'' following the lifting process, and into a locked and safety position in which it engages a safety element 55 on the bearing bracket 24'' or on the stop 33'' of the upper guide bar 14''. The two stops 32'' and 33'' are thereby held together reliably, and the single-armed lever 51 is kept safely in its forward position relative to the lifting and tilting frame 13'' or which corresponds to the locking position of the locking bar 38''. This locking and safety system remains intact as long as the lifting and tilting frame 13'' is in a tilted position, especially including the final dumping position. When the lifting and tilting frame returns during its swingback from its tilted position to an essentially vertical position, the locking and safety hook 35'' is swung back again by its gravity driven arm so that it releases the safety element 55. The upper guide bar 14" and the lifting and tilting frame 13" can then move again relative to each other, i.e. the stops 32" and 33" separate from one another At the same time, the return mechanism 53 swings the single-armed lever 51 back into its initial position in which the locking bar 38" releases the rim of the garbage can.

Figure 9:
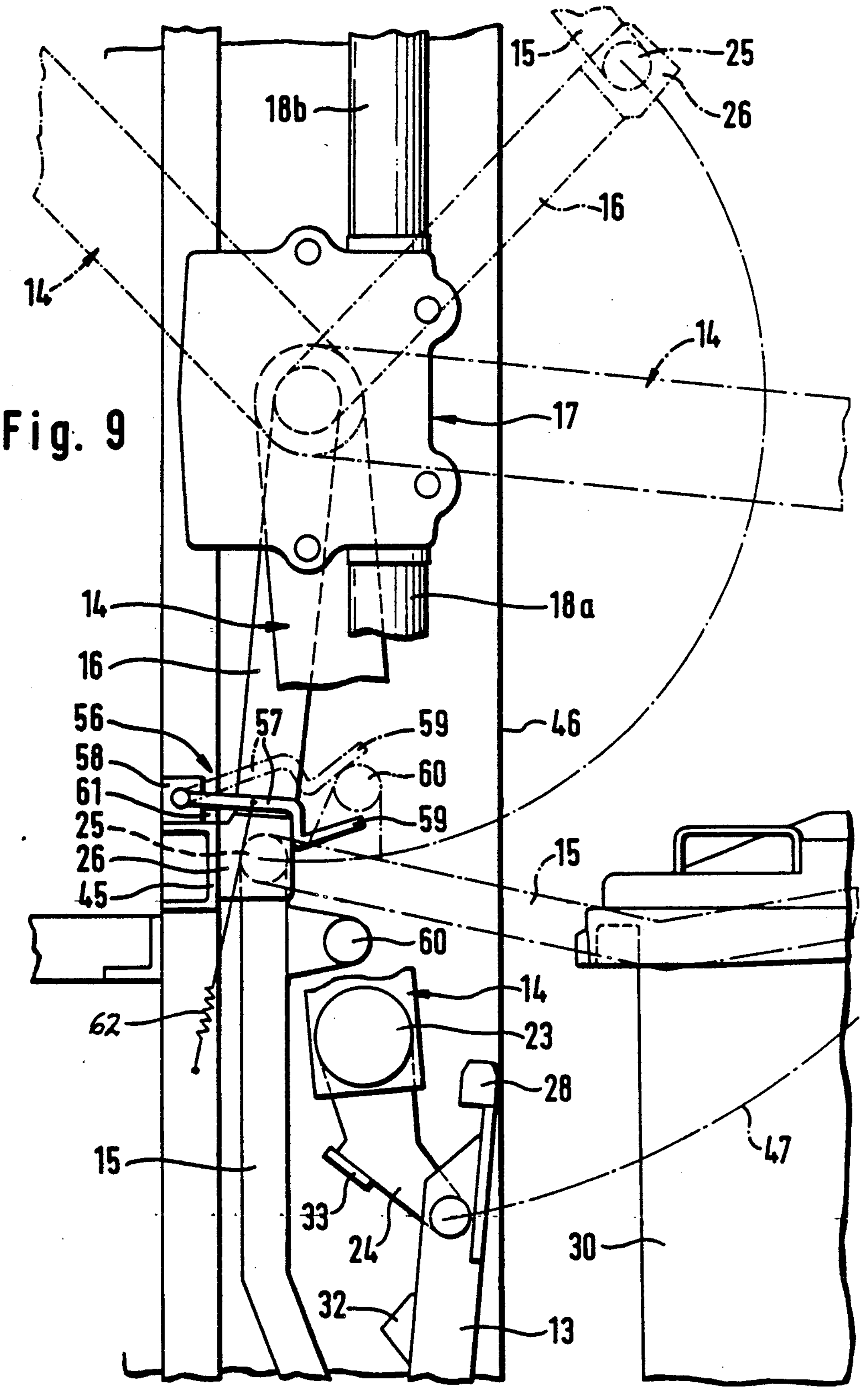
FIG. 9 is the dotted-line indicated cutout "9" from FIG. 1 in an enlarged representation of a lifting and tilting device with a hold-back lock for the support arm, with the lower guide bar of the four joint arrangement in its lower, initial position (unbroken lines) and in a swung-up position (broken lines) relative to the support arm.

FIG. 9 shows an advantageous, complementary construction of the lifting and tilting devices depicted in FIGS. 1 through 8 and FIGS. 10 through 12, namely a holdback lock for the support arm. In the absence of such a holdback lock it can happen that, during the motion of the lifting and tilting device from its lower starting position shown in FIG. 1, a swivel motion of the freely swiveling support arm sets in so that the entire four joint arrangement of the lifting and tilting device moves together, like a single-armed lever, towards the garbage can 30 to be emptied, pushing it away instead of gripping it. By holding the support arm 16 back during the initial motion, the four joint arrangement is forced to initiate a swivel motion of the guide bars 14, 15 and the lifting and tilting frame 13 relative to each other and, hence, a positive lifting motion of the lifting and tilting frame 13 sets in. To assure that this desired motion cycle takes place, a holdback lock 56 is provided which holds the support arm 16 back on the equipment frame or on the stop 45 mounted on the equipment frame until the lower guide bar 15 has been swung far enough up in the joint 25 that the lifting and tilting frame 13 has gripped the garbage can 30. In the example shown in FIG. 9, a holdback hook 57 is installed on a bearing block 58 placed on top of the stop 45 so as to pivot about a horizontal pin. This holdback hook 57 engages the abutment element 26 mounted on the support arm 16. To assure a reliable engagement of the abutment element 26 by the holdback hook 57, it can be provided with a retaining spring 62. The holdback hook 57 has at its free end an actuating arm 59 which interacts with an actuating cam 60 mounted on the lower guide bar. The actuating arm 59 is arranged obliquely and of sufficient length so that, when the support arm 16 swings back, the abutment element 26 will cam the holdback hook 57 up and be enabled to move under it into its locked position To make sure of this function, a limiting stop 61 keeping the holdback hook in its ready position can be provided on the bearing block 58.

When the lifting and tilting device begins moving out of its starting position shown in FIG. 1, the support arm 16 is first held against its abutment element 26 by means of the holdback hook 57 in contact with the stop 45 provided on the equipment frame. This brings about the desired swivel motion of the guide bars and of the lifting and tilting frame, the lower guide bar 15 swinging up in its joint 25 until its actuating cam 60 hits the actuating arm 59 of the holdback hook 57, lifting the latter out of its locking position As the motion of the lifting and tilting device continues, a swivel motion of the support arm 16 occurs so that the latter's abutment element 26 moves from under the holdback hook 57. The actuating cam 60 runs off the actuating arm 59 and the holdback hook 57 returns, either by gravity, or by return spring 62, to its ready position at the limiting stop 61. During the return motion of the lifting and tilting device, the abutment element 26 of the support arm 16 strikes the actuating arm 59, thereby raising the holdback hook 57 in order to move under the latter into its initial position. The holdback hook 57 then returns to its holdback position over the abutment element 26, or is pushed into this holdback position by return spring 62. Since the holdback hook is raised by the abutment element 26 during the return motion of the support arm, the actuating cam 60 of the lower guide bar 15 remains inactive during this part of the return motion cycle.

Figure 10:
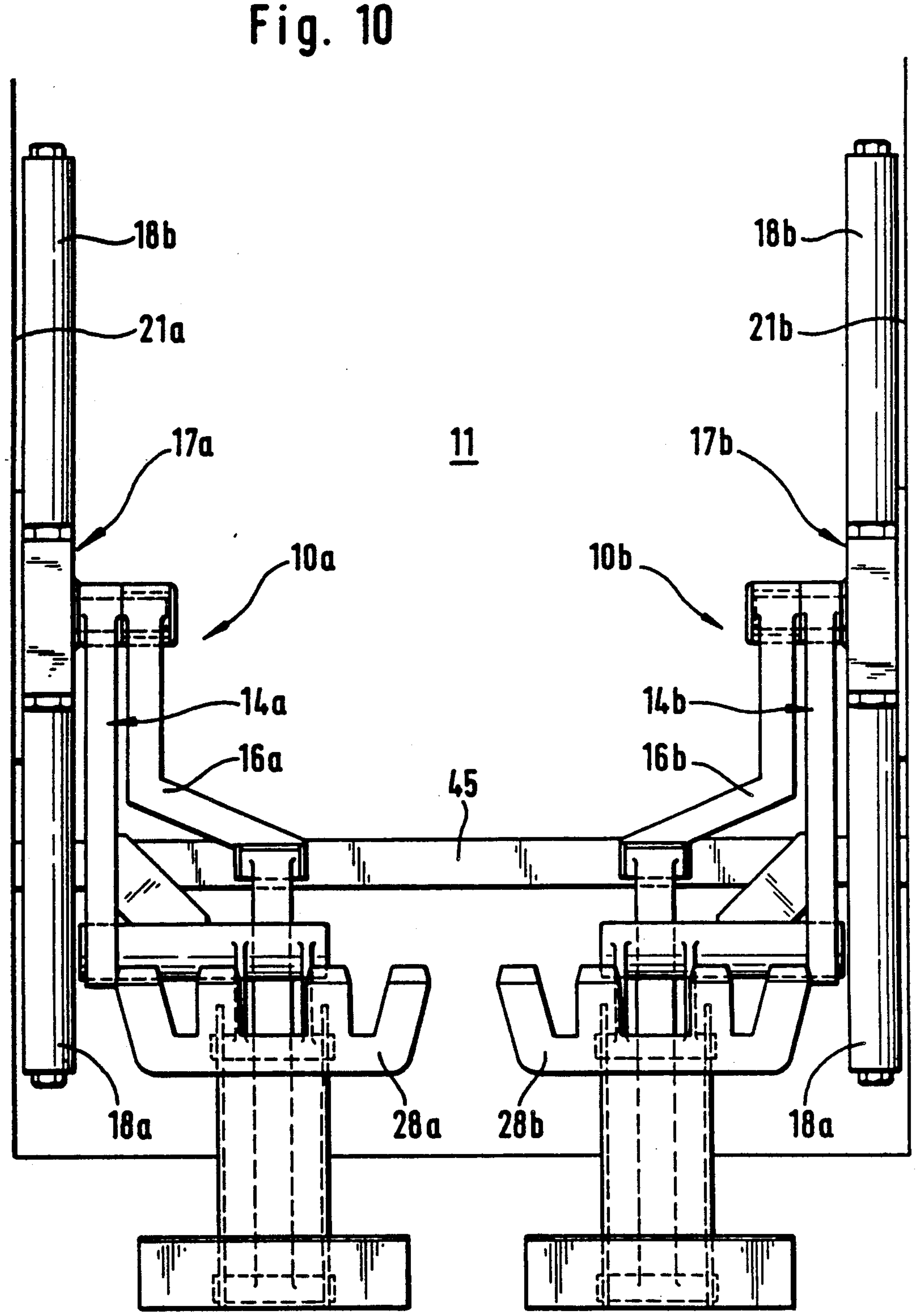
FIG. 10 is a further developed embodiment of the invention, as a twin lifting and tilting device in a representation corresponding to that of FIG. 2.

In the example of FIG. 10 a pair of lifting and tilting devices 10*a* and 10*b* is mounted in mirror image in the area of the pour-in opening 11 on the two vertical edges 21*a* and 21*b*. Each one of these lifting and tilting devices 10*a* and 10*b* has its own swivel drive 17*a* and 17*b*. The swivel drives 17*a* and 17*b* are connected to a pressure medium control which makes the simultaneous operation of both drives possible, either synchronously or separately. A large garbage container can be placed on both support beams 28*a* and 28*b* together and the swivel drives turned on for synchronous operation. The upper guide bars 14*a* and 14*b* thereby make possible a very exact and uniform upswinging motion, and hence a very exact and uniform lifting and dumping of the contents of a large container. Otherwise, the operating mode of each individual lifting and tilting device 10*a* and 10*b* is the same as described above in connection with FIGS. 1 through 4.

Figure 13:
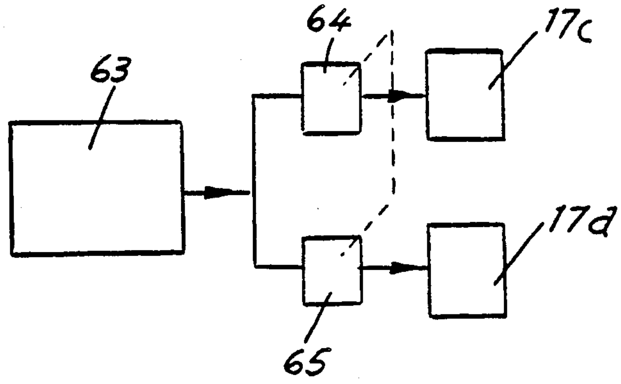
FIG. 13 is a schematic block diagram of a pneumatic control for the operation of the swivel power drives of FIG. 11.
Figure 11:
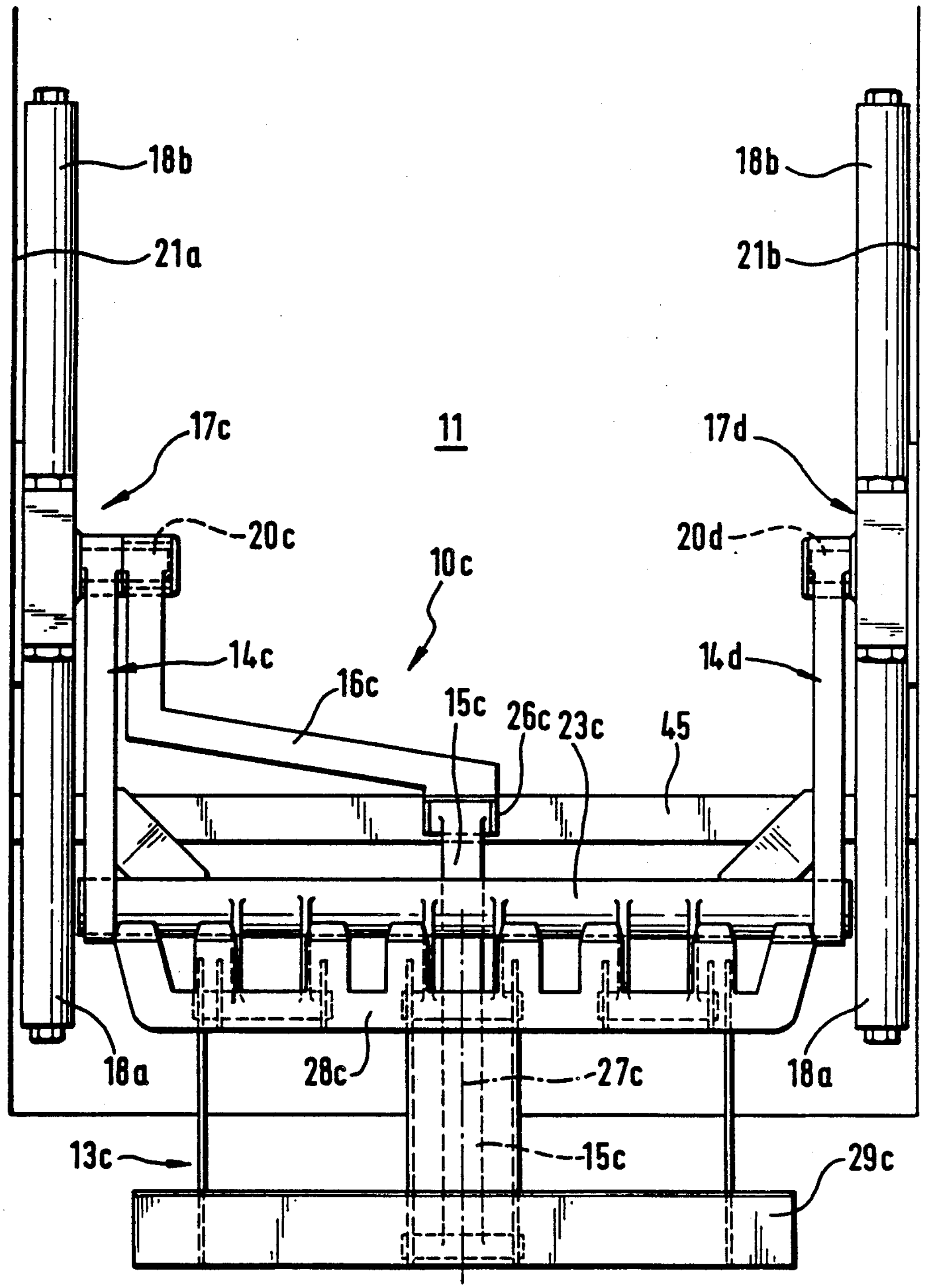
FIG. 11 is a further developed embodiment of the invention, with the lifting and tilting frame essentially extending across the entire width of the pour-in opening.

In the example of FIG. 11 there is mounted on each vertical edge 21*a* and 21*b* of the pour-in opening 11 a swivel drive 17*c* and 17*d*, respectively. Both swivel drives 17*c* and 17*d* form part of a joint lifting and tilting device 10*c* equipped with a single lifting and tilting frame 13*c*. Upper guide bars 14*c* and 14*d* are therefore coupled to the swivel drives 17*c* and 17*d* respectively. Both upper guide bars 14*c* and 14*d* have a common support arm or leg 23*c*. Mounted on this common support arm 23*c* is a common support beam 28*c* which pivots about a horizontal shaft and extends virtually across the entire width of the pour-in opening 11. Mounted below the support beam 28*c* is an abutment element or beam 29*c* for the containers to be emptied. The broad lifting and tilting frame 13*c* thus formed has only one lower guide bar 15*c* as a connection to a support arm 16*c*. This one lower guide bar 15*c* is disposed in the centerline 27*c* of the lifting and tilting frame 13*c*. Also, the support arm 16*c* is mounted to be freely pivotable on the drive shaft 20*c* of the swivel drive 17*c*. Correspondingly, the lower, oblique portion of the support arm 16*c* extends to the center plane 27*c* of the lifting and tilting frame 13*c*, which is also the center plane of the pour-in opening 11. The swivel drive 17*d* supports on its shorter drive shaft 20*d* only the upper guide bar 14*d*. Both swivel drives 17*c* and 17*d* are operated synchronously from a common control. For example, FIG. 13 diagrammatically shows a pneumatic pressure pump-/reservoir 63, and pressure regulator valves 64 and 65 connected to the drives 17*c* and 17*d* of FIG. 11, for effecting controlled, simultaneous operation of the drives in synchronism. Otherwise the operating mode of the lifting and tilting device 10*c* of FIG. 11 is analogous to the lifting and tilting device 10 of FIGS. 1 through 4.

Figure 12:
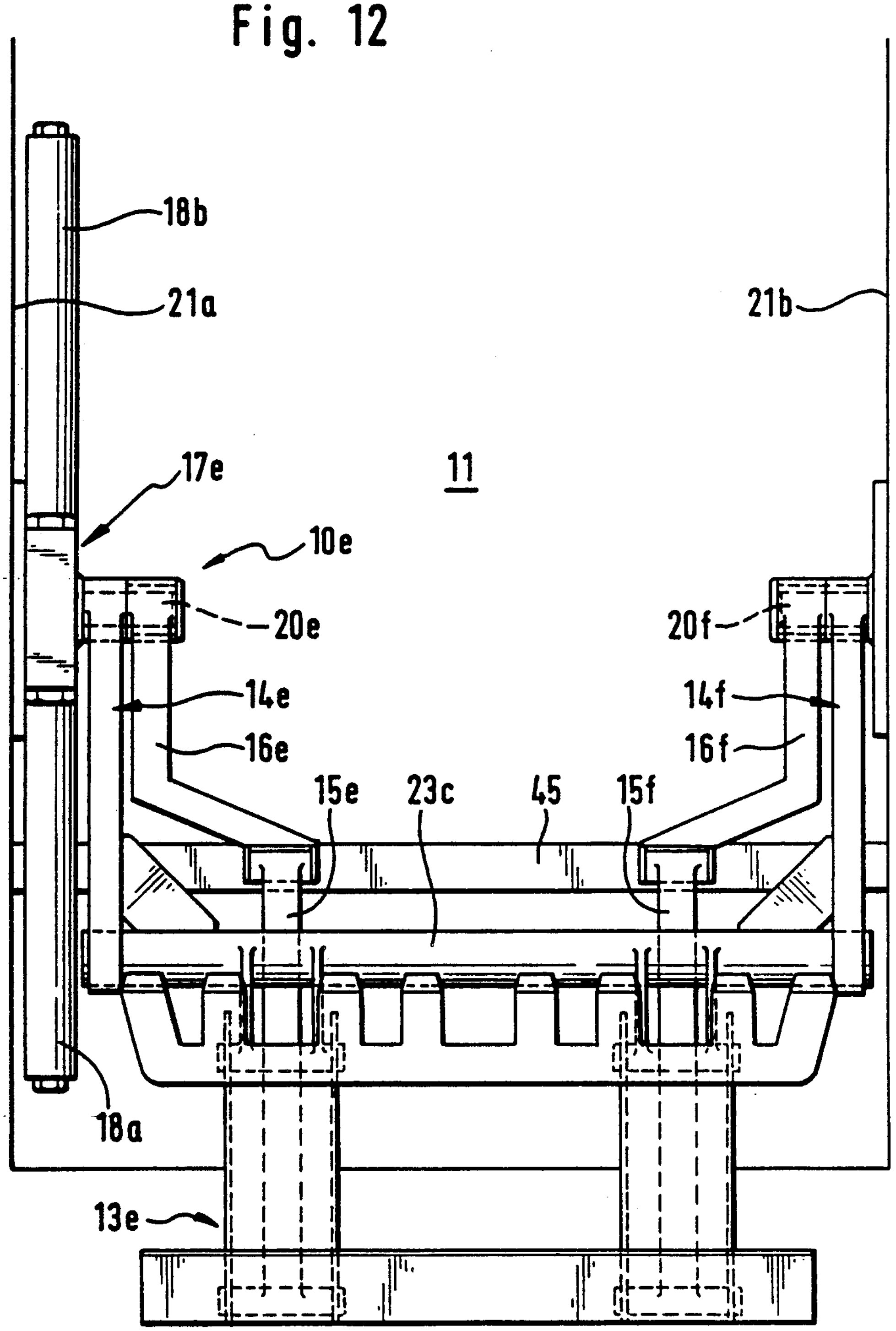
FIG. 12 is a representation of a lifting and tilting device according to the invention similar to that of FIG. 11, but with only one single swivel drive.

In the example of FIG. 12 the lifting and tilting device 10*e* differs from that of the FIG. 11 in that only one swivel drive 17*e* is provided. Coupled to the drive shaft 20*e* of the swivel drive 17*e* is the upper guide bar 14*e*, and the single support arm 16*e* pivots about it. The second vertical side edge 21*b* of the pour-in opening merely supports a bearing pin 20*f* as a pivot pin for the second upper guide bar 14*f* and the second support arm 16*f*. The use of two support arms 16*e* and 16*f*, extending less towards the center of the pour-in opening 11, offers the advantage that, considering the unilateral power supply provided in this embodiment of the lifting and tilting device 10*e*, the guidance of the broad lifting and tilting frame 13*e* is accomplished in practice by two juxtaposed quadrangles of joints, i.e. two upper guide bars 14*e* and 14*f* two support arms 16*e* and 16*f*, and two lower guide bars 15*e* and 15*f*, which makes it safer and better adapted to the supply of power from one side only. Otherwise, the operating mode of the lifting and tilting device 10*e* is the same as described above in connection with FIGS. 1 to 4.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

| List of reference symbols | |
|---|---|
| 10, a, b, c, e | Lifting and tilting device |
| 11 | Pour-in opening |
| 12 | Collection tank |
| 13, c, e | Lifting and tilting frame |
| 14, a, b, c, d, e, f | Upper guide bar |
| 15, c, e, f | Lower guide bar |
| 16, c, e, f | Support arm |
| 17, a, b, c, d, e | Swivel drive |
| 18, a, b | Cylinder/piston arrangement |
| 19 | Rack and pinion drive |
| 20, c, d, e, f | Drive shaft |
| 21, a, b | Vertical edge |
| 22 | Guide bar lever portion |
| 23, c | Support leg |
| 24 | Bearing bracket |
| 25 | Joint |
| 26, c | Abutment and bearing element |
| 27, c | Center plane |
| 28, a, b, c | Support beam |
| 29, c | Abutment element |
| 30 | Garbage can |
| 31 | Limiting device |
| 32 | Stop |
| 33 | Stop |
| 34 | Lock for quadrangle of joints |
| 35 | Locking hook |
| 36 | Gravity driven arm |
| 37 | Locking device |
| 38 | Locking bar |
| 39 | Horizontal shaft |
| 40 | Actuating cam |
| 41 | Actuating roller |
| 42 | Return Spring |
| 43 | Actuating lever |
| 44 | Pulling linkage |
| 45 | Stop |
| 46 | Outside edge |
| 47 | Circular track |
| 48 | Circular track |
| 49 | Circular track |
| 50 | Dimension |
| 51 | Single-armed lever |
| 52 | Horizontal shaft |
| 53 | Return device |
| 54 | Seating elements |
| 55 | Safety element |
| 56 | Holdback lock |
| 57 | Holdback hook |
| 58 | Bearing block |
| 59 | Actuating arm |
| 60 | Actuating cam |
| 61 | Limiting stop |
| 62 | Return spring |
| 63 | Pneumatic pump and reservoir |
| 64 | Pressure regulator valve |

-continued

| List of reference symbols | |
|---|---|
| 65 | Pressure regulator valve |

What is claimed is:

1. A lifting and tilting device (10) for emptying containers (30) into the pour-in opening (11) of a collection tank (12), said device having a quadrangle of joints with an upper (14) and a lower (15) guide bar forming the four joints, having a lifting and tilting frame (13) which receives the containers (30) to be emptied and retains them during the emptying process until the emptied container is put down, and having rear joint lever (16) opposite the lifting and tilting frame (13) as well as a power drive mechanism (18) inserted between the upper guide bar (14) of the quadrangle of joints and the collection tank (12) to generate the lifting and tilting motions, characterized in that the said drive mechanism comprises a swivel drive (17) having a rotary drive shaft (20) mounted in the area of the pour-in opening (11), in that the upper guide bar (14) of the device is drivingly carried by said shaft (20) and is thereby drivingly connected to said swivel drive (17) to be swung thereby as said shaft is turned, while the rear joint lever of the quadrangle of joints constitutes a support arm (16) which is pivotally connected to the swivel drive (17) and which contacts, in an initial position, a stop element (45) secured to the collection tank in the area of the pour-in opening (11).

2. A device according to claim 1, characterized in that the upper guide bar (14) and the support arm (16) are mounted at the swivel drive (17) so as to pivot coaxially, the upper guide bar (14) having its driving connection to the swivel drive (17) formed by said drive shaft (20) of the coaxial mounting, while the support arm (16) is mounted so as to pivot freely within a fixed swivel range.

3. A device according to claim 1, characterized in that the swivel drive (17) is disposed in the area of at least one vertical side edge (21) of the pour-in opening (11).

4. A device according to claim 3, characterized in that the upper guide bar (14) has a fixed support leg (23) which extends essentially horizontally and parallel to the plane of the pour-in opening and to which the lifting and tilting frame (13) is pivotably mounted, thus forming one of the four joints of the quadrangle of joints.

5. A device according to claim 4, characterized in that the said support leg (23) extends cantilevered in the manner of a crank from the upper guide bar (14) laterally into the area of the pour-in opening (11).

6. A device according to claim 1, characterized in that a limiting device (31) is provided, which becomes active in the course of the upward motion of the upper guide bar (14) and prevents the parts of the quadrangle of joints from moving further relative to each other.

7. A device according to claim 6, characterized in that the limiting device (31) has two stop elements (32, 33) which strike each other in the course of the upward motion of the upper guide bar (14), one element (33) being disposed on the upper guide bar (14) and the other element (32) being disposed on the lifting and tilting frame (13).

8. A device according to claim 6, characterized in that the limiting device (31) is adjustable.

9. A device according to claim 6, characterized in that a lock (34) for the quadrangle of joints is provided which becomes active in the course of the upward motion of the upper guide bar (14) and holds the lifting and tilting frame (13) and the upper guide bar (14) in fixed predetermined relative position during their further upward motion.

10. A device according to claim 1, characterized in that a locking mechanism (37) is provided which locks a gripped container (30) to the lifting and tilting frame (13) in the course of the upward motion of the upper guide bar (14), and which is actuated by virtue of the swivel motion of the parts of the quadrangle of joints relative to each other.

11. A device according to claim 10, characterized in that said locking mechanism (37) for the container (30) has a locking bar (38) adapted to be swung across the container rim.

12. A device according to claim 10, characterized in that the locking mechanism (37) for the container (30) has an actuating device containing a roller (41) and cam (40), one of which is mounted one on the upper guide bar (14) and the other of which is mounted on the lifting and tilting frame (13).

13. A device according to claim 1, and further including:

(a) an identifiable but mirror image lifting and tilting device (10*b*) mounted in the area of the pour-in opening (11), one each of said devices being at each vertical side edge (21*a*, 21*b*) of the pour-in opening (11).

14. Devices according to claim 13, characterized in that the gripping devices (28*a* 28*b*) for containers to be emptied, as provided on the lifting and tilting frames (13*a*, 13*b*) of the two lifting and tilting devices (10*a*, 10*b*), are so coordinated with each other that smaller containers (30) can be gripped by each one of the lifting and tilting frames (13*a* or 13*b*) and larger containers can be gripped jointly by both lifting and tilting frames (13*a*, 13*b*), and that the swivel drives (17*a*, 17*b*) of both lifting and tilting devices (10*a*, 10*b*) are selectively operable either synchronously or separately.

15. A device according to claim 13, characterized in that both power drive mechanisms (17*c*, 17*d*) are equipped with one common control.

16. A device according to claim 1, characterized in that said upper guide bar (14) comprises two parallel levers (14*c*, 14*d*) and a support leg (23*c*) extending between said levers essentially horizontally and parallel to the pour-in opening plane, said two levers (14*c*, 14*d*) being pivotally mounted respectively on the vertical side edges (21*a*, 21*b*) of the pour-in opening (11), said support leg (23*c*) extending essentially across the entire width of the pour-in opening (11).

17. A device according to claim 16, characterized in that only one (14*e*) of the levers of the upper guide bar (14*e*, 14*f*) is connected to said power drive mechanism (17*e*) while the second guide bar lever (14*f*) is mounted so as to pivot freely.

18. A device according to claim 1, characterized in that, on the collection tank (12) of a side-loader garbage vehicle, the driving shaft (20) of the power drive mechanism is mounted at such a level above the lower edge of the pour-in opening (11) and is offset so far inwardly from the outside edge (46) of the vehicle that, in their initial positions, all parts of the lifting and tilting device (10) are disposed behind an outside edge (46) of the vehicle.

19. A device according to claim 1, wherein said upper guide bar (14) moves solely along an essentially circular track (47) containing one of said quadrangle of joints, the center of said circular track being substantially coincident with said drive shaft (20).

20. A lifting and tilting device (10) for emptying containers (30) into the pour-in opening (11) of a collection tank (12), said device having a quadrangle of joints with an upper (14) and a lower (15) guide bar forming the four joints, having a lifting and tilting frame (13) which receives the containers (30) to be emptied and retains them during the emptying process until the emptied container is put down, and having rear joint lever (16) opposite the lifting and tilting frame (13) as well as a power drive mechanism (18) inserted between the upper guide bar (14) of the quadrangle of joints and the collection tank (12) to generate the lifting and tilting motions, characterized in that the said drive mechanism comprises a swivel drive (17) mounted in the area of the pour-in opening (11), in that the upper guide bar (14) of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), said swivel drive (17) being disposed in the area of at least one vertical side edge (21) of the pour-in opening (11), said support arm (16) being disposed in the area of the said one vertical side edge (21) of the pour-in opening and extending angularly at its lower portion, in its initial position, towards the center of the lifting and tilting frame (13).

21. A device according to claim 20, characterized in that the support arm (16) is provided with an abutment and bearing element (26) which sets the lower limit of the swivel range of the support arm (16) and, at the same time, contains components for a pivotal connection to the lower guide bar (15) so as to form one (25) of the four joints.

22. A device according to claim 21, characterized in that the abutment element (26) of the support arm (16) and the lower guide bar (15) lie essentially in a center plane (27) of the lifting and tilting frame (13) which contains the path of motion.

23. A lifting and tilting device (10) for emptying containers (30) into the pour-in opening (11) of a collection tank (12), said device having a quadrangle of joints with an upper (14) and a lower (15) guide bar forming the four joints, having a lifting and tilting frame (13) which receives the containers (30) to be emptied and retains them during the emptying process until the emptied container is put down, and having rear joint lever (16) opposite the lifting and tilting frame (13) as well as a power drive mechanism (18) inserted between the upper guide bar (14) of the quadrangle of joints and the collection tank (12) to generate the lifting and tilting motions, characterized in that the said drive mechanism comprises a swivel drive (17) mounted in the area of the pour-in opening (11), in that the upper guide bar (14) of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), and further including a limiting device (31) comprising cooperable stop elements (32, 33) and which becomes active in the course of the upward motion of the upper guide bar (14) and prevents the parts of the quadrangle of joints from moving further relative to each other, and also including a lock (34) for the quadrangle of joints which lock becomes active in the course of the upward motion of the upper guide bar (14) and holds the lifting and tilting frame (13) and the upper guide bar (14) in fixed predetermined relative position during their further upward motion, said lock containing a controlled locking hook (35) which secures the stop elements (32, 33) together.

24. A device according to claim 23, characterized in that said locking hook (35) is mounted so as to pivot into and out of its effective position and in that it has a gravity-driven arm (36) to effect its pivoting motion.

25. A lifting and tilting device (10) for emptying containers (30) into the pour-in opening (11) of a collection tank (12), said device having a quadrangle of joints with an upper (14') and a lower (15') guide bar forming the four joints, having a lifting and tilting frame (13') which receives the containers (30) to be emptied and retains them during the emptying process until the emptied container is put down, and having rear joint lever (16) opposite the lifting and tilting frame (13') as well as a power drive mechanism (18) inserted between the upper guide bar (14') of the quadrangle of joints and the collection tank (12) to generate the lifting and tilting motions, characterized in that the said drive mechanism comprises a swivel drive (17) mounted in the area of the pour-in opening (11), in that the upper guide bar (14') of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), and further including a locking mechanism (37') which locks a gripped container (30) to the lifting and tilting frame (13') in the course of the upward motion of the upper guide bar (14'), and which is actuated by virtue of the swivel motion of the parts of the quadrangle of joints relative to each other, said locking mechanism (37') for the container containing an actuating device (37') and a linkage (44), connected between the lifting and tilting frame (13') and one of the guide bars (14', 15').

26. A lifting and tilting device (10) for emptying containers (30) into the pour-in opening (11) of a collection tank (12), said device having a quadrangle of joints with an upper (14'') and a lower (15'') guide bar forming the four joints, having a lifting and tilting frame (13'') which receives the containers (30) to be emptied and retains them during the emptying process until the emptied container is put down, and having rear joint lever (16) opposite the lifting and tilting frame (13'') as well as a power drive mechanism (18) inserted between the upper guide bar (14'') of the quadrangle of joints and the collection tank (12) to generate the lifting and tilting motions, characterized in that the said drive mechanism comprises a swivel drive (17) mounted in the area of the pour-in opening (11), in that the upper guide bar (14'') of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), and further including a locking mechanism (37'') which locks a gripped container (30) to the lifting and tilting frame (13'') in the course of the upward motion of the upper guide bar (14''), and which is actuated by virtue of the swivel motion of the parts of the quadrangle of joints relative to each other, said locking mechanism (37'') for the container (30) having a locking bar (38'') adapted to be swung across the container rim, and said locking mechanism (37'') for the container (30) comprising the following structure: a single-armed lever (50) which is pivotable about a horizontal shaft (52) and can be swung into locking position, countering the force of a return mechanism (53), by means of an actuating stop (33'') mounted on the upper guide bar (14'') of the four joint arrangement.

27. A device according to claim 26, characterized in that a locking and safety mechanism is provided which retains said single armed lever (51) and the actuating stop (33'') in locking position as long as the four joint arrangement is in an upper operating position.

28. A device according to claim 26, characterized in that, under the action of the stop (33'') mounted on the upper guide bar (14''), the single-armed lever (51) of the container locking mechanism (37'') constitutes a limiting device (31'') that becomes effective between the upper guide bar (14'') and the lifting and tilting frame (13''), said locking and safety mechanism constituting also a safety means for the container locking mechanism (37'').

29. A lifting and tilting device (10) for emptying containers (30) into the pour-in opening (11) of a collection tank (12), said device having a quadrangle of joints with an upper (14) and a lower (15) guide bar forming the four joints, having a lifting and tilting frame (13) which receives the containers (30) to be emptied and retains them during the emptying process until the emptied container is put down, and having rear joint lever (16) opposite the lifting and tilting frame (13) as well as a power drive mechanism (18) inserted between the upper guide bar (14) of the quadrangle of joints and the collection tank (12) to generate the lifting and tilting motions, characterized in that the said drive mechanism comprises a swivel drive (17) mounted in the area of the pour-in opening (11), in that the upper guide bar (14) of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), and further including a holdback lock (56) for the support arm (16), which is releasable only by the motion of parts of the four joint arrangement relative to each other after these parts have left a lower zone of motion during their upward swivelling movement.

30. A device according to claim 29, characterized in that there is provided a holdback hook (57) mounted so as to pivot about a horizontal axis and engaging a part (26) of said support arm (16), and provided on the lower guide bar (15) an actuating cam (60) for releasing the holdback hook (57).

31. A device according to claim 30, characterized in that said holdback hook (57) has a spring-loaded return mechanism (62) and a limiting stop (61) for determining its ready position.

32. A lifting and tilting device (10) for emptying containers (30) into the pour-in opening (11) of a collection tank (12), said device having a quadrangle of joints with an upper (14) and a lower (15) guide bar forming the four joints, having a lifting and tilting frame (13) which receives the containers (30) to be emptied and retains them during the emptying process until the emptied container is put down, and having rear joint lever

(16) opposite the lifting and tilting frame (13) as well as a power drive mechanism (18) inserted between the upper guide bar (14) of the quadrangle of joints and the collection tank (12) to generate the lifting and tilting motions, characterized in that the said drive mechanism comprises a swivel drive (17) mounted in the area of the pour-in opening (11), in that the upper guide bart (14) of the device is drivingly connected to said swivel drive (17) while the rear joint lever of the quadrangle of joints constitutes a support arm (16) which is connected to the swivel drive (17) and which contacts, in an initial position, a stop element (45) mounted in the area of the pour-in opening (11), and further including an identifiable but mirror image lifting and tilting device (10*b*) mounted in the area of the pour-in opening (11), one each of said devices being at each vertical side edge (21*a*, 21*b*) of the pour-in opening (11), the quadrangles of joints containing a common support arm (16*c*) common to both upper guide bars (14*c*, *d*) and containing one common lower guide bar (15*c*).

33. A device according to claim 32, characterized in that the common support arm (16*c*) is pivotally mounted on one vertical side edge (21*a*) of the pour-in opening (11) and that its lower part extends essentially to the vertical center plane (27*c*) of the pour-in opening (11) whereas the common lower guide bar (15*c*) is disposed essentially in the vertical center plane (27*c*) of the pour-in opening (11).

* * * * *